United States Patent
Louis et al.

(10) Patent No.: US 10,526,468 B2
(45) Date of Patent: Jan. 7, 2020

(54) POLY(ARYLETHERKETONE) COMPOSITIONS

(71) Applicant: SOLVAY SPECIALTY POLYMERS USA, LLC, Alpharetta, GA (US)

(72) Inventors: Chantal Louis, Alpharetta, GA (US); Mohammad Jamal El-Hibri, Atlanta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 217 days.

(21) Appl. No.: 15/575,646

(22) PCT Filed: May 18, 2016

(86) PCT No.: PCT/EP2016/061124
§ 371 (c)(1),
(2) Date: Nov. 20, 2017

(87) PCT Pub. No.: WO2016/184904
PCT Pub. Date: Nov. 24, 2016

(65) Prior Publication Data
US 2018/0134865 A1      May 17, 2018

Related U.S. Application Data

(60) Provisional application No. 62/164,788, filed on May 21, 2015.

(51) Int. Cl.
C08K 3/22          (2006.01)
C08K 3/34          (2006.01)
(Continued)

(52) U.S. Cl.
CPC .................. *C08K 3/22* (2013.01); *C08K 3/34* (2013.01); *C08K 3/38* (2013.01); *C08K 7/14* (2013.01);
(Continued)

(58) Field of Classification Search
None
See application file for complete search history.

(56) References Cited

U.S. PATENT DOCUMENTS 4,542,065 A * 9/1985 Gaa ..................... C03C 25/326
428/375
4,728,573 A * 3/1988 Temple ................. C03C 25/26
428/375

(Continued)

FOREIGN PATENT DOCUMENTS

| CN | 101220196 A | 7/2008 |
| CN | 101508821 A | 8/2009 |

(Continued)

OTHER PUBLICATIONS

Technical Paper from agy "High Strenth Glass Fibers" 2006, 12 pages. (Year: 2006).*

(Continued)

*Primary Examiner* — Robert S Loewe
(74) *Attorney, Agent, or Firm* — Jarrod N. Raphael; Helene Laville

(57) ABSTRACT

A reinforced polymer composition [compositions (C)] comprising a poly(aryletherketone) (PAEK), an acidic glass fiber [glass fiber ($F_{ac}$)] and/or a neutral [glass fiber ($F_n$)] and a basic inorganic additive [inorganic basic additive (A)] are herein disclosed. Composition (C) is endowed with improved mechanical properties, in particular strength, elongation at break and impact resistance and can be used for the manufacture of a variety of finished articles wherein high mechanical performances are desired.

14 Claims, 1 Drawing Sheet

(51) Int. Cl.
    *C08K 3/38* (2006.01)
    *C08K 7/14* (2006.01)
    *C08L 71/10* (2006.01)
    *C08K 3/26* (2006.01)

(52) U.S. Cl.
    CPC ........ *C08L 71/10* (2013.01); *C08K 2003/222* (2013.01); *C08K 2003/2206* (2013.01); *C08K 2003/2227* (2013.01); *C08K 2003/2296* (2013.01); *C08K 2003/265* (2013.01)

(56) References Cited

U.S. PATENT DOCUMENTS

| | | | | |
|---|---|---|---|---|
| 4,764,397 | A * | 8/1988 | Fischer | C08G 65/4056 156/176 |
| 4,826,906 | A * | 5/1989 | Satake | C08G 75/024 524/381 |
| 4,837,296 | A * | 6/1989 | Heinz | C08G 65/4012 528/125 |
| 4,908,427 | A * | 3/1990 | Rostami | C08L 65/00 174/110 SR |
| 4,957,962 | A * | 9/1990 | Winkler | C08J 5/04 524/538 |
| 5,008,364 | A * | 4/1991 | Ittemann | C08L 71/00 528/125 |
| 5,358,748 | A * | 10/1994 | Mathews | C03C 25/34 427/389.8 |
| 5,578,659 | A * | 11/1996 | Anada | C08K 9/06 523/212 |
| 5,844,036 | A | 12/1998 | Hughes | |
| 5,916,958 | A * | 6/1999 | Kelly | C08G 75/23 524/497 |
| 6,013,716 | A * | 1/2000 | Nomura | C08J 5/06 428/378 |
| 6,191,675 | B1 | 2/2001 | Sudo et al. | |
| 2003/0060552 | A1* | 3/2003 | Balfour | C08K 3/34 524/423 |
| 2004/0054021 | A1 | 3/2004 | Seargeant | |
| 2006/0251878 | A1 | 11/2006 | Meakin | |
| 2009/0048379 | A1 | 2/2009 | Weinberg et al. | |
| 2010/0192851 | A1* | 8/2010 | Shah | B82Y 30/00 118/620 |
| 2011/0294943 | A1* | 12/2011 | Bertelo | C03C 25/26 524/540 |
| 2014/0322462 | A1* | 10/2014 | Gautam | C08L 81/06 428/34.5 |
| 2016/0122510 | A1* | 5/2016 | Verfaillie | C08K 7/14 524/492 |
| 2016/0136553 | A1* | 5/2016 | Healey | B01D 39/163 55/486 |
| 2018/0002524 | A1* | 1/2018 | El-Hibri | C08K 3/40 |

FOREIGN PATENT DOCUMENTS

| | | |
|---|---|---|
| CN | 103013090 A | 4/2013 |
| EP | 2067823 A1 | 6/2009 |
| EP | 2738219 A1 | 6/2014 |
| WO | 02057345 A1 | 7/2002 |
| WO | 2007107519 A1 | 9/2007 |
| WO | 13092628 A1 | 6/2013 |
| WO | 2016102330 A1 | 6/2016 |

OTHER PUBLICATIONS

Murphy J., in "Additives for Plastics Handbook", 2nd Edition, 2001, Chapter 5.2.3., p. 43-48—Elsevier Advanced Technology.

Hausrath R.L. et al., in "Fiberglass and Glass Technology", 2010, XIV, Chapter 5, p. 197-225—Wallenberger F.T. and Bingham P.A. (Editors).

* cited by examiner

POLY(ARYLETHERKETONE) COMPOSITIONS

CROSS REFERENCE TO RELATED APPLICATIONS

This application claims priority to U.S. provisional application No. 62/164,788 filed May 21, 2015, the whole content of this application being incorporated herein by reference for all purposes.

TECHNICAL FIELD

The present invention relates to reinforced compositions comprising poly(aryletherketones) (PAEK), to methods for manufacturing said compositions and to uses of said compositions.

BACKGROUND

PAEK polymers, including, for example, poly(etherketone) (PEK), poly(etheretherketone) (PEEK), poly(etherketoneketone) (PEKK), poly(etheretherketoneketone) (PEEKK) and poly(etherketoneetherketoneketone) (PEKEKK) polymers, are well known for their exceptional balance of technical properties, namely high melting point, good thermal stability, high stiffness and strength, good toughness and especially excellent chemical resistance. Therefore, PAEK polymers have potential for a wide variety of uses and their favourable properties class them with the best of the engineering polymers. For example, PEEK polymers have found increasing use in the manufacturing of high temperature and fire resistant films because PEEK has good elongation and good flexibility in thin sections such as films, or for coating of wires because PEEK has good flame resistance, and may be self-extinguishing with very low smoke.

One of the goals in the manufacture of PAEK polymers is that of enhancing their mechanical properties, such as strength, elongation at break and impact resistance.

Compositions comprising PAEK polymers and reinforcing fibers and/or additives are known in the art and can be referred to as "reinforced PAEK polymers".

U.S. Pat. No. 5,844,036 (HOECHST CELANESE CORP) 1 Dec. 1998 discloses polyether ketone compositions comprising a polyarylether ketone, a reinforcing fiber, such as chopped glass and chopped carbon fiber fillers (col. 6, penultimate par.) and an immobilizing filler. The reinforcing fiber is said to provide high strength and stiffness, while the immobilizing filler is said to provide resistance to high temperature distortion. Immobilizing fillers of different nature are listed in this document; although mention is made of calcium carbonate, magnesium carbonate and boron nitride, there is no disclosure or specific suggestion to use such additives in combination with glass fibers. Table 1 reports the results obtained on different PEEK compositions, in particular two compositions containing a PEEK a glass fiber (Corning 731 ED) as reinforcing fiber and MICA as immobilizing filler. Moreover and more important, the amount of immobilizing filler is relatively high with respect to the total volume of the composition (from 30 to 45% vol. with respect to the composition; col. 7, lines 10 to 11).

U.S. Pat. No. 6,191,675 (HITACHI, LTD) 20 Feb. 2001 relates to a high-voltage transformer and discloses, inter alia, a bobbin material for the transformer, said bobbin material comprising a resin (e.g. a PEK) and an inorganic filler which may be a glass fiber, talc and mixtures thereof or another inorganic filler, e.g. calcium carbonate. The amount of inorganic filler in the compositions wherefrom the bobbin is obtained ranges from 10 to 70% wt with respect to the composition weight. In particular, Examples 14 and 18 in table 3 refer to compositions comprising a PEEK, a glass fiber and talc, wherein talc amounts to 20% wt of the compositions.

US 2004054021 (SERGEANT KENNETH MALCOM) 19 Mar. 2004 relates to a method of making a foamed material comprising heating a mixture which includes a polymer, especially a PAEK, and a decomposable material, especially magnesium hydroxide or aluminium hydroxide/hydrated alumina. The polymer may include reinforcement means, e.g. carbon and/or glass fibers. In this method, the decomposable material decomposes to produce water which in turn produces foaming within the polymeric material. Example 14 refers to an extrudate obtained from a PEEK comprising 30% glass fiber reinforcement blended with 10% wt of $Mg(OH)_2$, $MgCO_3$, $CaCO_3$, $FeO_3$, $MnO_4$.

US 2006251878 (VICTREX MFG LTD) 9 Nov. 2006 relates to a polymeric material, for example a PEEK, and to a composite material comprising said polymeric material, which is said to have a lower viscosity of commercially available PEEK, while retaining similar mechanical properties to those of Victrex® PEEK 150. The polymeric material may comprise fibrous fillers, including glass fibers, and non-fibrous fillers, including, e.g. calcium carbonate. The amount of filler in the material can range from 20 to 70% wt with respect to the weight of the material.

US 2009048379 (SOLVAY ADVANCED POLYMERS LLC) 19 Feb. 2009 discloses certain polymer compositions endowed with chemical resistance and environmental stress rupture resistance, said compositions comprising a PAEK, a polyphenylene sulfone and a glass fiber in defined weight ratios. The compositions may include optional ingredients, including MgO and ZnO. Example 3, in particular, discloses a composition comprising Radel® R-5100 NT PPSU, Victrex® 150 P PEEK and Certainteed® 910 P glass fiber, a glass fiber having basic character.

EP 2067823 A (SOLVAY SA) 2 Dec. 2008 relates to a polymer blend comprising at least a PAEK and at least one high glass temperature sulfone polymer. This document discloses a control composition (Table 3) comprising Victrex® 150 P PEEK, Certainteed® 910 P glass fiber and ZnO.

CN 101220196 (NANJINH COMPTECH CO LTD) 16 Jul. 2008 relates to a PEEK composite material for the manufacture of valve seals which consists of polyetherether-ketone, nanoparticles, filling materials and addition agent materials in definite amounts. The filling material can be a glass fiber and one of the nanoparticles is MgO.

CN 101508821 (UNIV NORTHWESTERN POLYTECHNICH) 19 Sep. 2009 discloses a PEEK composite used for a solid positioning head frame and a preparation method thereof. The composite may comprise a glass fiber and calcium carbonate.

CN 103013090 (CHONGQING CINWO PLASTICS CO LTD; CHONGQING 863 TRAFFIC ENGINEERING TECHNOLOGY CT LTD PARTNERSHIP; CH) 3 Apr. 2013 relates to a PAEK composite material that contains, in addition to a PAEK, a polyetrafluoroethylene resin, a fiber, e.g. a glass fiber, and a filler, including calcium carbonate and calcium sulphate. The composite may include boron nitride as solid lubricant.

SUMMARY OF THE INVENTION

The Applicant has now surprisingly found out that the mechanical properties, in particular strength, elongation at break and impact resistance, of PAEK polymers can be significantly improved by adding to said polymers a glass fiber having acidic character and/or a glass fiber having neutral character (herein after also respectively referred to as "acidic glass fiber" and "neutral glass fiber") and a basic inorganic additive.

In particular, the Applicant observed that the mechanical properties are improved with respect to known compositions that contain PAEK polymers in combination with basic glass fibers and basic inorganic compounds and that such improvement is achieved even when very low amounts of basic inorganic compound are used.

Accordingly, the present invention relates to a polymer composition [composition (C)], which comprises:
(a) a poly(aryletherketone) polymer [polymer (PAEK)];
(a-1) optionally, an aromatic sulfone polymer [polymer (SP)];
(b) an acidic glass fiber [glass fiber ($F_{ac}$)] and/or a neutral glass fiber ($F_n$); and
(c) a basic inorganic additive [additive (A)].

In a first embodiment, the invention relates to a polymer composition (C) as defined above comprising an acidic glass fiber ($F_{ac}$) [composition ($C_{ac}$)].

In a second embodiment, the invention relates to a polymer composition (C) as defined above comprising a neutral glass fiber ($F_n$) [composition ($C_n$)].

In a third embodiment the invention relates to a polymer composition (C) as defined above comprising an acidic glass fiber ($F_{ac}$) and a neutral glass fiber ($F_n$) [composition ($C_{ac+n}$)].

Preferably, composition (C) is a composition ($C_{ac}$) or ($C_n$); more preferably, composition (C) is a composition ($C_{ac}$).

The present invention further relates to methods for manufacturing composition (C) and to uses of composition (C) for the manufacture of formed articles.

DETAILED DESCRIPTION OF THE INVENTION

General Definitions

For the sake of clarity, throughout the present application:
any reference to general formulae of (PAEK) is intended to include each specific formula falling within the respective general formula, unless indicated otherwise;
the indeterminate article "a" in expressions like "a (PAEK)", "an acidic glass fiber ($F_{ac}$)", etc. . . . is intended to mean "one or more", or "at least one" unless indicated otherwise;
the use of brackets "( )" before and after names, symbols or numbers identifying formulae or parts of formulae, e.g. "a (PAEK)", "an acidic glass fiber ($F_{ac}$)", etc . . . , has the mere purpose of better distinguishing that name, symbol or number from the rest of the text; thus, said parentheses could also be omitted;
when numerical ranges are indicated, range ends are included;
the term "halogen" includes fluorine, chlorine, bromine and iodine, unless indicated otherwise;
the adjective "aromatic" or "aryl" denotes any mono- or polynuclear cyclic group (or moiety) having a number of π electrons equal to 4n+2, wherein n is 0 or any positive integer;
the term "method" is used as synonym of process and vice-versa.

The Poly(Aryletherketone) Polymer [Polymer (PAEK)]

For the purpose of the present invention, the term "(PAEK) polymer" is intended to denote any polymer comprising recurring units, wherein more than 50% moles of said recurring units are recurring units ($R_{PAEK}$) comprising a Ar—C(=O)—Ar' group, with Ar and Ar', equal to or different from each other, are aromatic groups. The recurring units ($R_{PAEK}$) are generally selected from the group consisting of formulae (J-A) to (J-O) herein below:

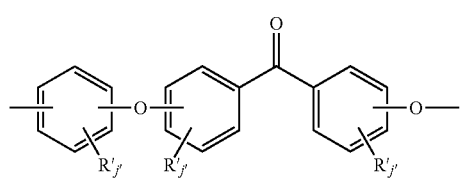 (J-A)

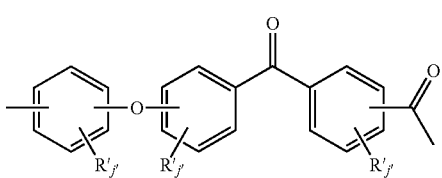 (J-B)

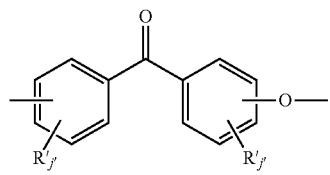 (J-C)

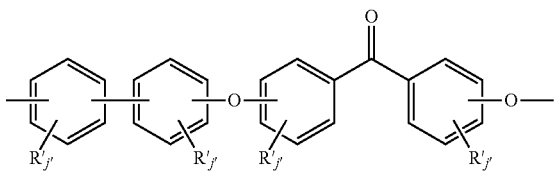 (J-D)

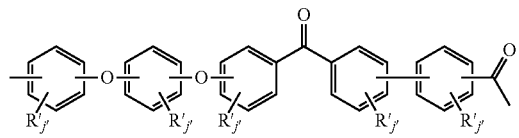 (J-E)

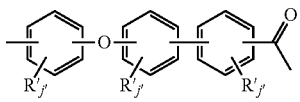 (J-F)

-continued (J-G)
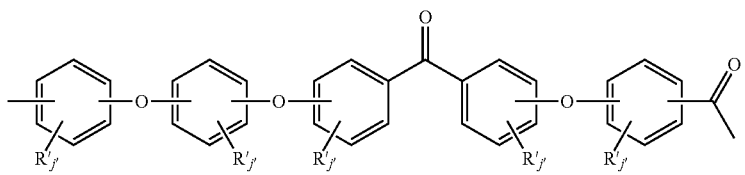

(J-H)
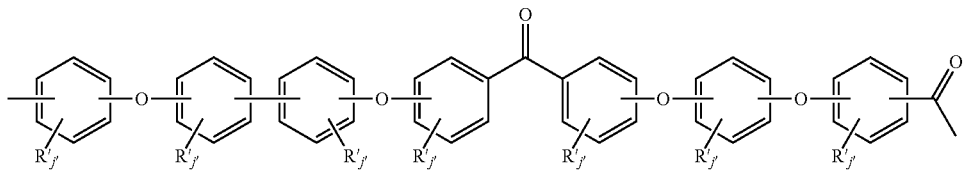

(J-I)
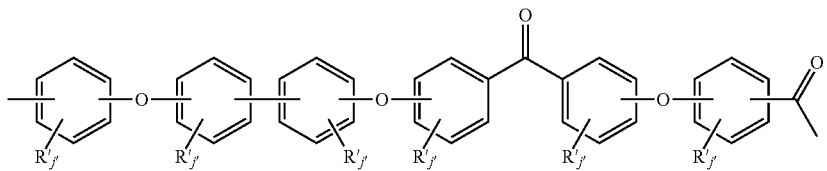

(J-J)
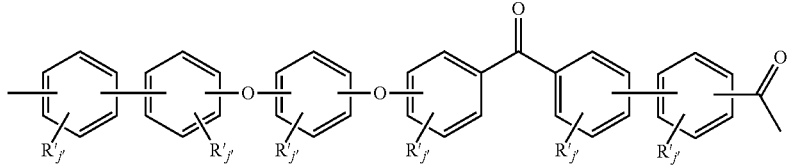

(J-K)
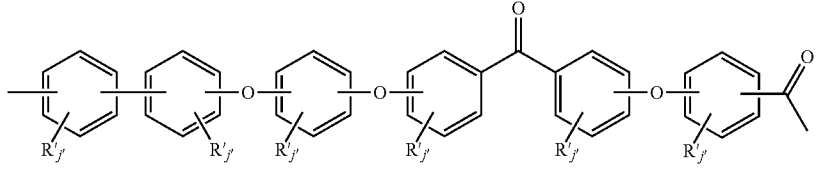

(J-L)
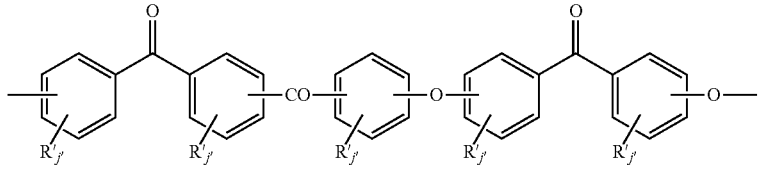

(J-M) (J-N)
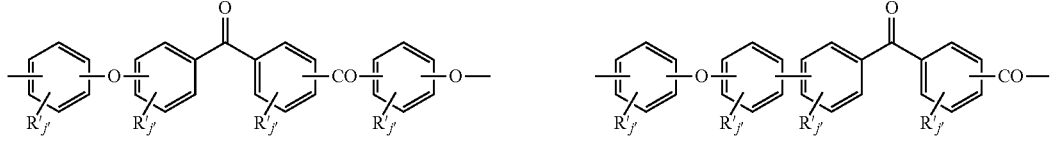

(J-O)
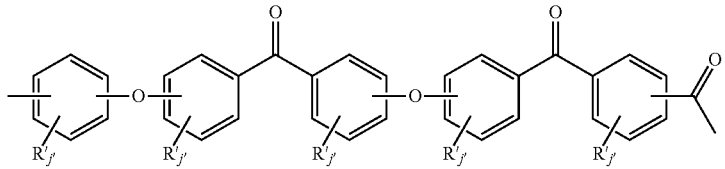

wherein:

each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4.

In recurring unit ($R_{PAEK}$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage.

Still, in recurring units ($R_{PAEK}$), j' is preferably at each occurrence zero, that is to say that the phenylene moieties have no other substituents than those enabling linkages in the main chain of the polymer.

Preferred recurring units ($R_{PAEK}$) are thus selected from those of formulae (J'-A) to (J'-O) herein below:

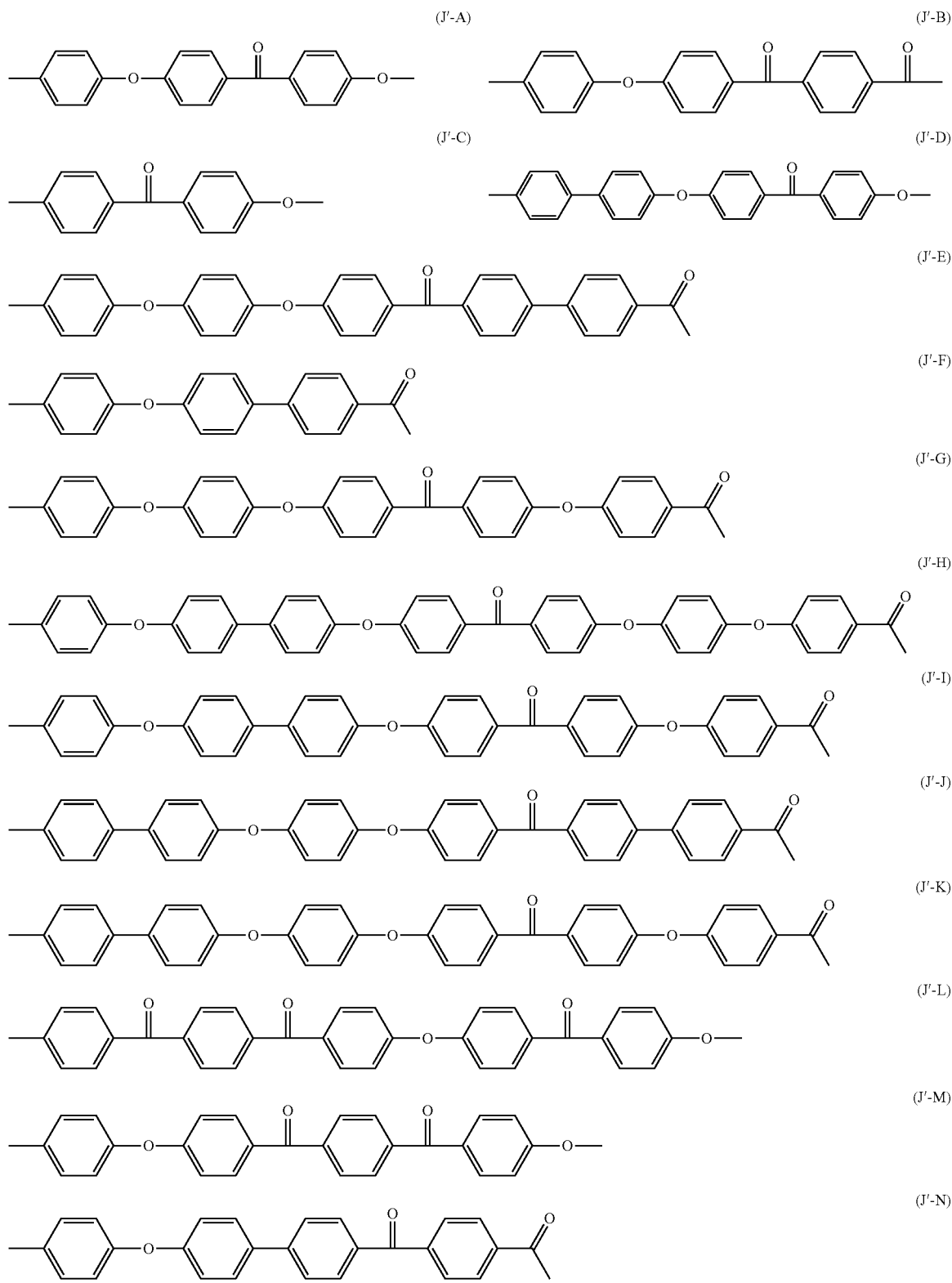

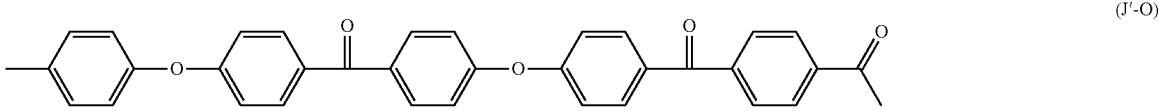

(J'-O)

Polyaryletherketones (PAEK) are generally crystalline aromatic polymers, readily available from a variety of commercial sources. The polyaryletherketones (PAEK) have preferably reduced viscosities in the range of from about 0.5 to about 1.8 dl/g as measured in concentrated sulfuric acid at 25° C. and at atmospheric pressure. The polyaryletherketones (PAEK) have preferably a melt viscosity (measured at 400° C., 1000 s$^{-1}$) from about 0.050 to 0.65 kPa-s.

In a preferred embodiment of the invention, at least 50% moles of the recurring units of polyaryletherketones (PAEK) are recurring units (J'-A). Preferably at least 60% moles, more preferably at least 70% moles, still more preferably at least 80% moles and most preferably at least 90% moles of the recurring units of polyaryletherketones (PAEK) are recurring units (J'-A). Excellent results were obtained when the polyaryletherketones (PAEK) contained no recurring unit other than recurring units (J'-A). In exemplary embodiments, substantially all of the recurring units of the polyaryletherketones (PAEK) are recurring units (J'-A).

In another preferred embodiment of the invention, at least 50% moles of the recurring units of polyaryletherketones (PAEK) are recurring units (J'-B). Preferably at least 60% moles, more preferably at least 70% moles, still more preferably at least 80% moles and most preferably at least 90% moles of the recurring units of polyaryletherketones (PAEK) are recurring units (J'-B). Even more preferably, the polyaryletherketone (PAEK) contains no recurring unit other than recurring units (J'-B). In exemplary embodiments, substantially all of the recurring units of the polyaryletherketones (PAEK) are recurring units (J'-B).

In yet another preferred embodiment of the invention, at least 50% moles of the recurring units of polyaryletherketones (PAEK) are recurring units (J'-C). Preferably at least 60% moles, more preferably at least 70% moles, still more preferably at least 80% moles and most preferably at least 90% moles of the recurring units of polyaryletherketones (PAEK) are recurring units (J'-C). Even more preferably, the polyaryletherketone (PAEK) contains no recurring unit other than recurring units (J'-C). In exemplary embodiments, substantially all of the recurring units of the polyaryletherketones (PAEK) are recurring units (J'-C).

In yet another preferred embodiment of the invention, at least 5% moles of the recurring units of polyaryletherketones (PAEK) are recurring units (J'-D). Preferably at least 10% moles, more preferably at least 20% moles, still more preferably at least 25% moles and most preferably at least 30% moles of the recurring units of polyaryletherketones (PAEK) are recurring units (J'-D). Even more preferably, the polyaryletherketone (PAEK) contains 25% recurring units (J'-D) and 75% of recurring units (J'-A).

Most preferably, the polyaryletherketone (PAEK) of the polymer composition (C) is a polyetheretherketone (PEEK), i.e. a homopolymer of recurring units (J'-A). Excellent results were obtained when using KetaSpire® commercially available from Solvay Specialty Polymers USA, LLC.

In the polymer composition (C), the polyaryletherketone (PAEK) is present in an amount of advantageously at least 1 wt. %, at least 2 wt. %, at least 3 wt. %, at least 4 wt. %, at least 5 wt. %, at least 6 wt. %, at least 7 wt. %, at least 8 wt. %, at least 9 wt. %, at least 10 wt. %, at least 11 wt. %, at least 12 wt. %, at least 13 wt. %, at least 14 wt. %, at least 15 wt. %, at least 16 wt. %, at least 17 wt. %, at least 18 wt. %, at least 19 wt. %, at least 20 wt. %, at least 21 wt. %, at least 22 wt. %, at least 23 wt. %, or at least 24 wt. %, based on the total weight of the polymer composition (C).

The polyaryletherketone (PAEK) is also present in an amount of advantageously at most 90 wt. %, at most 75 wt. %, at most 70 wt. %, at most 65 wt. %, at most 60 wt. %, at most 55 wt. %, at most 50 wt. %, at most 45 wt. %, at most 44 wt. %, at most 43 wt. %, at most 42 wt. %, at most 41 wt. %, at most 40 wt. %, at most 39 wt. %, at most 38 wt. %, at most 37 wt. %, at most 36 wt. %, at most 35 wt. %, at most 34 wt. %, at most 33 wt. %, at most 32 wt. %, at most 31 wt. %, at most 30 wt. %, at most 29 wt. %, at most 28 wt. %, at most 27 wt. %, or at most 26 wt. %, based on the total weight of the polymer composition (C).

Preferably, the polyaryletherketone (PAEK) is present in an amount ranging from 2 to 90 wt. %, more preferably from 3 to 85 wt. %, still more preferably from 4 to 80 wt. % and most preferably from 5 to 75 wt. %, based on the total weight of the polymer composition (C).

The Aromatic Sulfone Polymer [Polymer (SP)]

For the purpose of the present invention, the expression "aromatic sulfone polymer (SP)" is intended to denote any polymer wherein at least 50% moles of the recurring units thereof [recurring units ($R_{SP}$)] comprise at least one group of formula (SP):

with Ar and Ar', equal to or different from each other, being aromatic groups.

Recurring units ($R_{SP}$) generally comply with formula ($R_{SP-1}$):

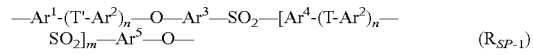

wherein:
  $Ar^1$, $Ar^2$, $Ar^3$, $Ar^4$, and $Ar^5$, equal to or different from each other and at each occurrence, are independently an aromatic mono- or polynuclear moiety;
  T and T', equal to or different from each other and at each occurrence, is independently a bond or a divalent group optionally comprising one or more than one heteroatom; preferably T' is selected from the group consisting of a bond, —CH$_2$—, —C(O)—, —C(CH$_3$)$_2$—, —C(CF$_3$)$_2$—, —C(=CCl$_2$)—, —SO$_2$—, —C(CH$_3$)(CH$_2$CH$_2$COOH)—, and a group of formula:

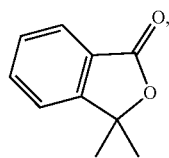

and preferably, T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

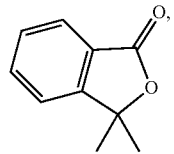

and n and m, equal to or different from each other, are independently zero or an integer of 1 to 5.

The aromatic sulfone polymer (SP) has typically a glass transition temperature of advantageously at least 150° C., preferably at least 160° C., more preferably at least 175° C.

In a preferred embodiment of the invention, at least 50% moles of the recurring units of aromatic sulfone polymer (SP) are recurring units (R$_{SP-2}$) and/or recurring units (R$_{SP-3}$):

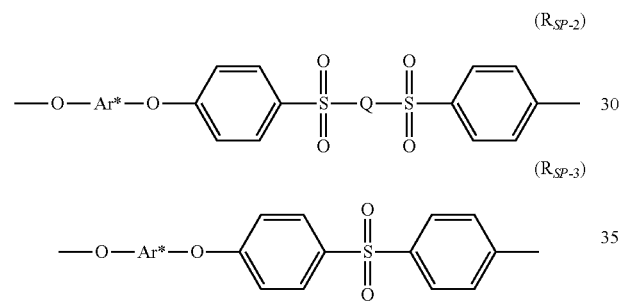

wherein:

Q and Ar*, equal to or different from each other and at each occurrence, are independently a divalent aromatic group; preferably Ar* and Q, equal to or different from each other and at each occurrence, are independently selected from the group consisting of the following structures:

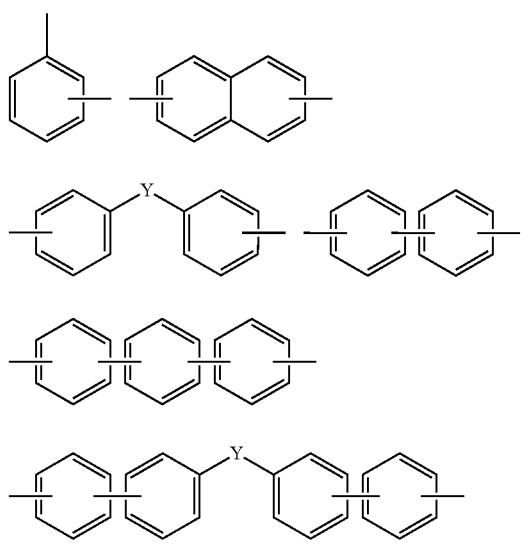

and corresponding optionally substituted structures, with Y being —O—, —CH=CH—, —C≡C—, —S—, —C(O)—, —(CH$_2$)$_n$—, —C(CF$_3$)$_2$—, —C(CH$_3$)$_2$—, —SO$_2$—, —(CF$_2$)$_n$—, with n being an integer from 1 to 5 and and mixtures thereof.

Recurring units (R$_{SP-2}$) are preferably selected from the group consisting of:

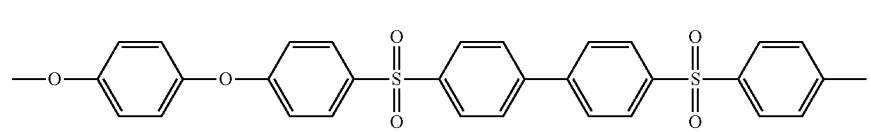
(i)

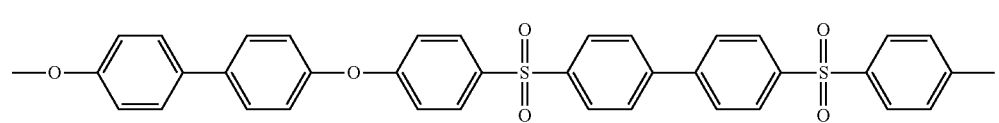
(ii)

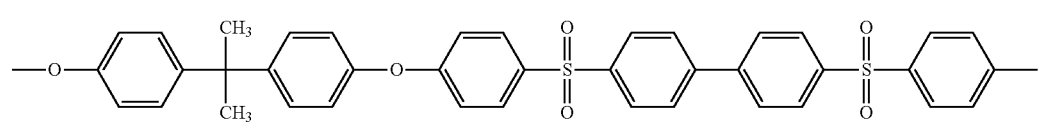
(iii)

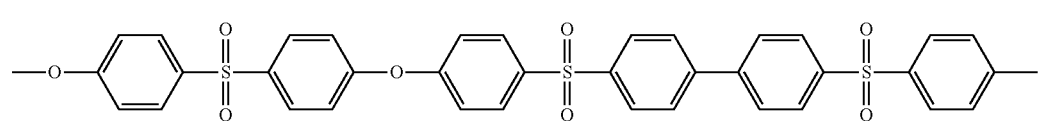
(iv)

and mixtures thereof.

Recurring units ($R_{SP-3}$) are preferably selected from the group consisting of:

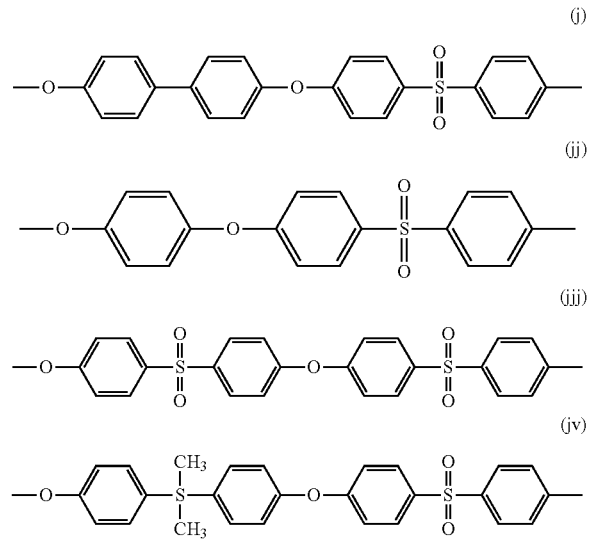

and mixtures thereof.

Aromatic sulfone polymer (SP) comprises at least 50% moles, preferably 70% moles, more preferably 75% moles of recurring units ($R_{SP-2}$) and/or ($R_{SP-3}$), still more preferably, it contains no recurring unit other than recurring units ($R_{SP-2}$) and/or ($R_{SP-3}$).

In a preferred embodiment of the invention, at least 50% moles of the recurring units of aromatic sulfone polymer (SP) are recurring units (j). Preferably at least 60% moles, more preferably at least 70% moles, still more preferably at least 80% moles and most preferably at least 90% moles of the recurring units of aromatic sulfone polymer (SP) are recurring units (j). Even more preferably, the aromatic sulfone polymer (SP) contains no recurring unit or substantially no recurring unit other than recurring units (j); such a polymer (polyphenylsulfone (PPSU) hereinafter) is notably available as Radel® PPSU commercially available from Solvay Specialty Polymers USA, L.L.C.

In another preferred embodiment of the invention, at least 50% moles of the recurring units of aromatic sulfone polymer (SP) are recurring units (jjj). Preferably at least 60% moles, more preferably at least 70% moles, still more preferably at least 80% moles and most preferably at least 90% moles of the recurring units of aromatic sulfone polymer (SP) are recurring units (jjj). Even more preferably, the aromatic sulfone polymer (SP) contains no recurring units or substantially no recurring units other than recurring units (jjj); such a polymer (polyethersulfone (PESU) hereinafter) is notably available as Veradel® PESU, commercially available from Solvay Specialty Polymers USA, L.L.C.

In a still another preferred embodiment of the invention, at least 50% moles of the recurring units of aromatic sulfone polymer (SP) are recurring units (jv). Preferably at least 60% moles, more preferably at least 70% moles, still more preferably at least 80% moles and most preferably at least 90% moles of the recurring units of aromatic sulfone polymer (SP) are recurring units (jv). Even more preferably, the aromatic sulfone polymer (SP) contains no recurring units or substantially no recurring units other than recurring units (jv); such a polymer (polysulfone (PSU) hereinafter) is notably available as Udel® PSU, commercially available from Solvay Specialty Polymers USA, L.L.C.

Preferably, aromatic sulfone polymer (P) is selected from the group consisting of PPSU, PESU, PSU or mixtures thereof.

When only one aromatic sulfone polymer (SP) is present in the polymer composition (C), it is preferably polyphenylsulfone (PPSU). When two aromatic sulfone polymers (SP) are present in the polymer composition (C), they are preferably polyphenylsulfone (PPSU) and polysulfone (PSU).

The aromatic sulfone polymer (SP) of interest have advantageously a weight average molecular weight of at least 20000 g/mol, preferably at least 25000 g/mol, more preferably at least 30000 g/mol and most preferably of at least 35000 g/mol. They also have advantageously a molecular weight of at most 70000 g/mol, preferably at most 65000 g/mol, more preferably at most 60000 g/mol and most preferably of at most 55000 g/mol.

In the polymer composition (C), the aromatic sulfone polymer (SP) can be present in a total amount of advantageously at least 10 wt. %, preferably at least 15 wt. %, more preferably at least 20 wt. %, still more preferably at least 25 wt. %, based on the total weight of the polymer composition (C).

The aromatic sulfone polymer (SP) can also present in a total amount of advantageously at most 80 wt. %, preferably at most 70 wt. %, more preferably at most 65 wt. %, still more preferably at most 60 wt. %, even more preferably at most 55 wt. %, yet more preferably at most 50 wt. % and most preferably at most 45 wt. %, based on the total weight of the polymer composition (C).

Preferably, the aromatic sulfone polymer (SP) can be present in a total amount ranging from 10 to 50 wt. %, more preferably from 15 to 45 wt. %, still more preferably from 20 to 40 wt. % and most preferably from 25 to 35 wt. %, based on the total weight of the polymer composition (C).

Advantageously, composition (C) comprises a (PPSU) containing no recurring units other than recurring units (j), such as Radel® PPSU, in combination with a polyetheretherketone (PEEK), i.e. a homopolymer of recurring units (J'-A), such as KetaSpire® PEEK.

Glass Fibers (F)

For the purpose of the present invention, the expression "acidic glass fiber ($F_{ac}$)" denotes a glass fiber whose pH, typically measured in deionized water, is at most 7.0, at most 6.9, at most 6.8, at most 6.7, at most 6.6, at most 6.5, at most 6.4, at most 6.3, or at most 6.2.

Preferably, an acidic glass fiber ($F_{ac}$) is a glass fiber whose pH of a 20% wt slurry in deionized water, defined as wt ($F_{ac}$)/[(wt ($F_{ac}$)+wt (deionized water)]×100, typically at 25° C., is at most 7.0, at most 6.9, at most 6.8, at most 6.7, at most 6.6, at most 6.5, at most 6.4, at most 6.3, or at most 6.2. Typically, the pH of such slurry is at most 0.5 units, at most 0.4 units, at most 0.3 units, at most 0.2 units, or at most 0.1 units higher than the pH of deionized water; advantageously, the pH of the slurry is lower than the pH of deionized water.

The expression "neutral glass fiber ($F_n$)" denotes a glass fiber whose pH, typically measured in deionized water, is at least higher than 7.0 and at most 8.2, at most 8.1, at most 8.0, at most 7.9, at most 7.8, at most 7.7, at most 7.6, or at most 7.5.

Typically, the neutral glass fiber ($F_n$) is a glass fiber whose pH of a 20% wt slurry in deionized water, defined as wt ($F_n$)/[wt ($F_n$)+wt (deionized water)]×100, typically at 25° C., is at least higher than 7.0 and at most 8.2, at most 8.1, at most 8.0, at most 7.9, at most 7.8, at most 7.7, at most 7.6, or at most 7.5.

Although a basic glass fiber is not included in the compositions (C) of the present invention, for the avoidance of doubt, the expression "basic glass fiber" denotes a glass fiber whose pH, typically measured in deionized water, is at least higher than 8.2.

Typically, a basic glass fiber is a glass fiber whose pH of a 20% wt slurry in deionized water, defined as wt (basic glass fiber)/[(wt (basic glass fiber)+wt (deionized water)]× 100, typically at 25° C., is higher than 8.2.

The expression "deionized water" denotes water whose resistivity is preferably higher than 18.0 MΩ·cm at 25° C. A preferred example of deionized water is MilliQ® water.

Glass fibers are silica-based glass compounds that contain several metal oxides which can be tailored to create different types of glass. The main oxide is silica in the form of silica sand; the other oxides such as calcium, sodium and aluminium are incorporated to reduce the melting temperature and impede crystallization. Glass fibers may have a round cross-section or a non-circular cross-section (so called "flat glass fibers"), including oval, elliptical or rectangular. The glass fibers may be added as endless fibers or as chopped glass fibers, whereas chopped glass fibers are preferred. The glass fibers have generally an equivalent diameter of 5 to 20 preferably of 5 to 15 μm and more preferably of 5 to 10 μm. All glass fiber types, such as A, C, D, E, M, S, R, T glass fibers (as described in chapter 5.2.3, pages 43-48 of *Additives for Plastics Handbook*, 2nd ed, John Murphy), or any mixtures thereof or mixtures thereof may be used, however, R, S and T glass fibers are preferred, while S and T glass fibers are even more preferred, S fibers being most preferred. R, S and T glass fibers are high modulus glass fibers that have typically an elastic modulus of at least 76, preferably at least 78, more preferably at least 80, and most preferably at least 82 GPa as measured according to ASTM D2343.

R, S and T glass fibers are well known in the art. They are notably described in Fiberglass and Glass Technology, Wallenberger, Frederick T.; Bingham, Paul A. (Eds.), 2010, XIV. R, S and T glass fibers are composed essentially of oxides of silicon, aluminium and magnesium. In particular, those glass fibers comprise typically from 62-75 wt. % of $SiO_2$, from 16-28 wt. % of $Al_2O_3$ and from 5-14 wt. % of MgO. To the contrary of the regular E-glass fibers widely used in polymer compositions, R, S and T glass fibers comprise less than 10 wt. % of CaO.

Acidic glass fibers ($F_{ac}$) are available on the market, for example from AGY. Excellent results were obtained using an acidic glass fiber ($F_{ac}$) available from AGY as S2 553 glass fiber.

Neutral glass fibers ($F_n$) are also available on the market, for example from Owens Corning. Good results were obtained using a neutral glass fiber ($F_n$) available from Owens Corning as FC295-10P.

Basic Inorganic Additive (A)

For the purpose of the invention, the expression "basic inorganic additive (A)" denotes an inorganic compound whose pH, typically measured in deionized water, is at least 7.0, at least 7.1, at least 7.2, at least 7.3, at least 7.4, at least 7.5, at least 7.6, at least 7.7, at least 7.8, at least 7.9, at least 8.0, at least 8.1, at least 8.2, at least 8.3, at least 8.4, at least 8.5, at least 8.6, at least 8.7, at least 8.8, at least 8.9, at least 9.0, at least 9.1, at least 9.2, at least 9.3, at least 9.4, at least 9.5, at least 9.6, at least 9.7, at least 9.8, at least 9.9, or at least 10.0.

Preferably, "basic inorganic additive (A)" is an inorganic compound whose pH of a 10% wt slurry in deionized water (wherein deionized water is as defined above), defined as wt (A)/[wt (A)+wt (deionized water)]×100, typically at 25° C., is at least 7.0, at least 7.1, at least 7.2, at least 7.3, at least 7.4, at least 7.5, at least 7.6, at least 7.7, at least 7.8, at least 7.9, at least 8.0, at least 8.1, at least 8.2, at least 8.3, at least 8.4, at least 8.5, at least 8.6, at least 8.7, at least 8.8, at least 8.9, at least 9.0, at least 9.1, at least 9.2, at least 9.3, at least 9.4, at least 9.5, at least 9.6, at least 9.7, at least 9.8, at least 9.9, or at least 10.0.

Typically, the pH of such slurry is at least 1.0, at least 1.1, at least 1.2, at least 1.3, at least 1.4, at least 1.5, at least 1.6, at least 1.7, at least 1.8, at least 1.9, at least 2.0 units higher than the pH of deionized water and is at most 6.5, at most 6.4, at most 6.3, at most 6.2, at most 6.1, or at most 6.0 units higher than the pH of deionized water.

Preferably, the basic inorganic additive (A) is contained in composition (C) in an amount ranging from 0.01% wt to 5% wt with respect to the weight of the composition. More preferably, the amount of basic inorganic additive (A) ranges from 0.01% wt to 0.5% wt, even more preferably from 0.1 to 0.5% wt with respect to the weight of the composition.

Basic inorganic additive (A) will be preferably selected in such a way as it does not decompose, or decomposes to a low extent, when heated to high temperature, so that foaming does not occur. Preferably, basic inorganic additive (A) presents a weight loss by non-isothermal TGA (thermogravimetric analysis) from 50° C. to 500° C. of less than 15%.

In order to ensure good dispersion in composition (C), the basic inorganic additive (A) is preferably used as a fine powder. Preferably, its particle size distribution is such that 100% of the basic inorganic additive (A) passes through a 150 μm (100 mesh) screen; more preferably, at least 99% of the basic inorganic additive (A) passes through a 75 μm (200 mesh) screen.

Examples of basic inorganic additives (A) include calcium oxide, calcium carbonate, magnesium oxide, hydrotalcite [$Mg_6Al_2CO_3(OH)_{16} \cdot 4(H_2O)$], zinc oxide, boron nitride, barium sulphate, mica, silica, talc [$Mg_3Si_4O_{10}(OH)_2$], alumina, and clay and mixtures thereof.

Preferably, basic inorganic additive (A) is magnesium oxide, calcium oxide, hydrotalcite or a mixture thereof. More preferably, basic inorganic additive (A) is magnesium oxide or calcium oxide or a mixture thereof. More preferably, basic inorganic additive (A) is magnesium oxide. Preferably, magnesium oxide and calcium oxide, as contained in composition (C) in amounts ranging from 0.1% to 0.5% wt with respect to the weight of the composition, more preferably from 0.1% to 0.3% wt. In particular, experiments carried out by the Applicant have demonstrated that when magnesium oxide or calcium oxide is combined with a polymer (PAEK) and an acidic glass fiber ($F_{ac}$) or a neutral glass fiber ($F_n$) to respectively provide a composition ($C_{ac}$) and a composition ($C_n$) as defined above, a significant increase of tensile strength, tensile elongation at break, flexural strength and unnotched Izod impact is observed with respect to compositions comprising a polymer (PAEK), a basic inorganic additive (B) and a basic glass fiber and also with respect to polymers (PAEK) that are mixed (or reinforced) with an acidic or a neutral glass fiber only.

Excellent results were obtained for compositions ($C_{ac}$) comprising only a PAEK polymer, namely a PEEK polymer, an acidic glass fiber and from 0.10% to 0.30% wt of magnesium oxide with respect to the weight of the composition.

Optional Ingredients

The polymer composition (C) may further optionally comprise additional additives such as ultraviolet light stabilizers, heat stabilizers, antioxidants, pigments, processing aids, lubricants, flame retardants, and/or conductivity additive such as carbon black and carbon nanofibrils.

The polymer composition (C) may also further comprise other polymers than the polyaryletherketone (PAEK) and the aromatic sulfone polymer (SP). In particular, the polymer composition (C) may further comprise polymers such as polyetherimides, polyphenylsulfides and/or polycarbonates.

The polymer composition (C) may further comprise flame retardants such as halogen and halogen free flame retardants.

Methods of Manufacturing Composition (C) and Uses Thereof

The preparation of the polymer composition (C) can be carried out by blending a polymer (PAEK) as defined above and, optionally, a polymer (SP) as defined above with basic inorganic additive (B) as defined above and any other optional ingredient as defined above, followed by melt-mixing with acidic glass fiber (F) as defined above. Any known melt-mixing process that is suitable for preparing thermoplastic molding compositions can be used for the manufacture of composition (C). Such a process is typically carried out by heating the thermoplastic polymer above the melting temperature of the thermoplastic polymer thereby forming a melt of the thermoplastic polymer.

The process for the preparation of the composition (C) can be carried out in a melt-mixing apparatus, for which any melt-mixing apparatus known to the one skilled in the art of preparing polymer compositions by melt mixing can be used. Suitable melt-mixing apparatus are, for example, kneaders, Banbury mixers, single-screw extruders, and twin-screw extruders.

Preferably, use is made of an extruder fitted with means for dosing all the desired components to the extruder, either to the extruder's throat or to the melt. In the process for the preparation of the polymer composition (C) the constituting components for forming the composition are fed to the melt-mixing apparatus and melt-mixed in that apparatus. The constituting components may be fed simultaneously as a powder mixture or granule mixer, also known as dry-blend, or may be fed separately. For best results, dry-blend of the polymer and ingredients other than the glass fiber is fed gravimetrically to the extruder hopper at the feed throat section of the extruder while the glass fiber is metered downstream into the melt also gravimetrically at the target weight % of the overall polymer composition. This approach of feeding the glass fiber into the molten polymer preserves more of the length of the fiber in the finished compound thus contributing to higher mechanical properties relative to the case where the glass is fed in the feed throat section with the polymer, the basic inorganic additive and other optional ingredients.

Composition (C) according to the present invention typically has a final density equal to or higher than 1.35 g/cm$^3$, typically higher than 1.40 g/cm$^3$.

The composition (C) exhibits preferably a flexural strength at least 3% higher than the flexural strength of the same composition that does not contain any inorganic additive, more preferably at least 4% higher and most preferably at least 7% higher than the flexural strength of the same composition that does not contain any inorganic additive.

Moreover and more important, the composition (C), in particular the composition ($C_{ac}$) and ($C_n$) comprising MgO and CaO, exhibits a flexural strength higher, typically at least 16% higher, than the flexural strength of a composition comprising a PAEK, an inorganic basic additive, in particular MgO, and a basic glass fiber.

The composition (C) exhibits preferably an unnotched Izod impact resistance at least 6% higher than the unnotched Izod impact resistance of the same composition that does not contain any inorganic additive, more preferably at least 10% higher and most preferably at least 14% higher than the unnotched Izod impact resistance of the same composition that does not contain any inorganic additive.

Moreover and more important, the composition (C), in particular the composition ($C_{ac}$) and ($C_n$) comprising MgO and CaO, exhibits an unnotched Izod impact resistance higher, typically at least 11% higher, than the flexural strength of a composition comprising a PAEK, an inorganic basic additive, in particular MgO and a basic glass fiber, Composition (C) can be used in the industry for the manufacture of a variety of finished articles. Accordingly, a further object of the present invention is a finished article made from, or comprising, composition (C). Articles that can be manufactured from composition (C) are in particular those requiring high levels of strength, stiffness and toughness.

Advantageously, the article may be an injection moulded article, an extrusion moulded article, a shaped article, a coated article, or a casted article.

Non-limiting examples of articles include bearing articles such as radial and axial bearings for auto transmission, bearings used in dampers, shock absorbers, bearings in any kind of pumps, e.g., acid pumps; hydraulically actuated seal rings for clutch components; gears or the like.

In an exemplary embodiment, the article is a bearing article.

The bearing article may include several parts, wherein at least one of said parts, and optionally all of them, include composition (C) as described above.

A further non-limiting example of finished article made from composition (C) is represented by structural parts of mobile electronic devices.

Accordingly, in one embodiment, the present invention relates to a mobile electronic device comprising at least one structural part made of a composition (C) as above described, and in particular to a laptop, a mobile phone, a GPS, a tablet, personal digital assistants, portable recording devices, portable reproducing devices and portable radio receivers.

The structural parts of the mobile electronic devices made from composition (C) according to the present invention may be coated with metal by any known methods for accomplishing that, such as vacuum deposition (including various methods of heating the metal to be deposited), electroless plating, electroplating, chemical vapor deposition, metal sputtering, and electron beam deposition. Although the metal may adhere well to the structural parts without any special treatment, usually some well-known in the art method for improving adhesion will be used. This may range from simple abrasion of the synthetic resin surface to roughen it, addition of adhesion promotion agents, chemical etching, functionalization of the surface by exposure to plasma and/or radiation (for instance laser or UV radiation) or any combination of these. Also, some of the metal coating methods comprise at least one step where the structural part is immersed in an acid bath. More than one metal or metal alloy may be plated onto the structural parts made from composition (C), for example one metal or alloy may be plated directly onto the synthetic resin surface because of its good adhesion, and another metal or alloy may be plated on top of that because it has a higher strength and/or stiffness. Useful metals and alloys to form the metal coating include copper, nickel, iron-nickel, cobalt, cobalt-nickel, and chromium, and combinations of these in different layers. Preferred metals and alloys are copper, nickel, and iron-nickel, and nickel is more preferred. The surface of the structural part may be fully or partly coated with metal. Preferably more than 50 percent of the surface area will be coated, more preferably all of the surface will be coated. In different areas of the structural part the thickness and/or the number of metal layers, and/or the composition of the metal layers may vary. The metal may be coated in patterns to efficiently improve one or more properties in certain sections of the structural part.

The invention will be disclosed in greater detail by means of non-limiting examples in the following section.

Should the disclosure of any patents, patent applications, and publications which are incorporated herein by reference conflict with the description of the present application to the extent that it may render a term unclear, the present description shall take precedence.

DESCRIPTION OF EMBODIMENTS

Figure 1:
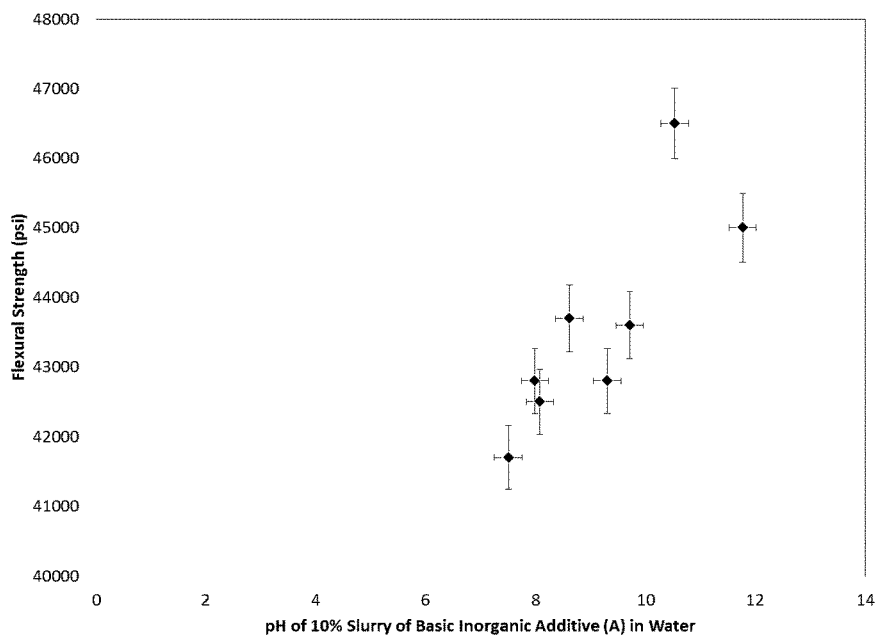
FIG. 1 reports the flexural strength of a composition comprising KetaSpire® PEEK, an acidic glass fiber and a basic additive.

In this section, the results obtained on 15 compositions (eleven Examples according to the present invention, one Comparative Example and three Controls) are reported.
Starting Materials
PAEK Polymers The PAEK polymers used in these examples were KetaSpire® KT-880P, KT-820P PEEK polymers (commercially available from Solvay Specialty Polymers USA, L.L.C), having specification melt viscosity ranges of 0.12-0.18 kPa$^{-s}$ and 0.38-0.50 kPa$^{-s}$, respectively. The melt viscosity was measured by a capillary rheometer at a temperature of 400° C. and a shear rate of 1000 s$^{-1}$.

The aromatic sulfone polymer used in Example 12 was a Radel® R-5100 NT polyphenylsulfone (PPSU), commercially available from Solvay Specialty Polymers USA, L.L.C), having a melt flow range specification range of 14.0-20.00 g/10 min, as measured using ASTM D 1238 at 400° C. and an applied weight of 2.16 kg.
Glass Fibers The following chopped glass fibers of different types and grades were used in the tested compositions:
OCV 910A: an E-glass chopped fiberglass from Owens Corning Vetrotex having a nominal fiber diameter of 11 microns. This glass fiber (including its sizing) has a basic character when acidity/basicity is tested according to the method reported below in the subsection "Analytical methods".
AGY S2 553: an S-glass fiber from AGY that has a nominal fiber diameter of 7.5 microns and a high temperature sizing. This glass fiber (including its sizing) has an acidic character when acidity/basicity is tested according to the method reported below in the subsection "Analytical methods".
FC295-10P: an S-glass fiber from Owens Corning having a nominal fiber diameter of 10 um and a high temperature sizing. This glass fiber (including its sizing) has a near neutral character when acidity/basicity is tested according to the method reported below in the subsection "Analytical methods".

Inorganic Additives

The inorganic additives used in the tested compositions were:
magnesium oxide—grade: Kyowamag® MF-150 from Kyowa Chemical Industry;
calcium oxide—grade: CA602 from Atlantic Equipment Engineers;
calcium carbonate—grade: Omyacarb® F from Azalea Color;
zinc oxide—grade: Kadox® 911 from Zincorp of America;
talc—grade: Mistron® Vapor R from Lintech International;
boron nitride—grade: Boronid® 51-SF from ESK Ceramics
barium sulfate—grade: USP from Spectrum Chemicals and Laboratory Products, Inc.

The exact formulations and raw materials used are shown in Tables 1-3.
Preparation of the Compositions The compositions of the Examples according to the invention and the composition of Comparative Examples 1-3 were prepared by first tumble blending the PEEK polymer with the inorganic additive at the desired compositional ratios for about 20 minutes, followed by melt-mixing with 30% glass fiber of the desired glass fiber grade using a 26 mm diameter Coperion ZSK-26 co-rotating partially intermeshing twin screw extruder having an L/D ratio of 48:1. The extruder had 12 barrel sections with barrel sections 2 through 11 being heated to set point temperatures as follows:
Barrel 2: 345° C.;
Barrels 4-6: 365° C.;
Barrel 7: 360° C.;
Barrel 8: 350° C.;
Barrels 9-12: 340° C.;
Die: 340° C.

The dry blend of the PEEK polymer and the inorganic additive were fed at barrel section 1 using a gravimetric feeder at nominal throughput rate of 28 lb/hr (12.7 kg/hr), while the glass fiber was fed to the extruder at barrel section 7 at a nominal throughput rate of 12 lb/hr (5.4 kg/hr). The extruder was operated at a screw speed of about 200 RPM and vacuum venting was applied at barrel section 10 during compounding to strip off moisture and any possible residual volatiles from the compound. A single-hole die was used for all the compounds and the molten polymer strand exiting the die was cooled in a water trough and then cut in a pelletizer to form pellets approximately 3.0 mm in length by 2.7 mm in diameter.

Controls A, B and C were compositions which contained only PEEK resin and glass fiber (control A: acidic glass fiber; contol B: neutral glass fiber; control C: basic glass fiber). In these cases, the PEEK polymer was fed at barrel 1 of the extruder, while the glass fiber was metered downstream at barrel 7 at similar processing conditions to those mentioned above for the Examples.

Table 1 below reports in detail the amounts of ingredients of in the Controls, Comparative Example and Examples according to the invention.

TABLE 1

| Example | Glass fiber* | Additive | Additive Specific Gravity | Additive Loading (phr) | Additive Loading (Vol. %) |
|---|---|---|---|---|---|
| Control A | AGY S2 553 | None | N/A | 0 | 0 |
| Control B | FC295-10P | None | N/A | 0 | 0 |
| Control C | OCV 910A | None | N/A | 0 | 0 |
| Comparative Example 1 | OCV 910A | MgO | 3.71 | 0.30 | 0.124 |
| Ex. 1 | AGY S2 553 | MgO | 3.71 | 0.10 | 0.041 |
| Ex. 2 | AGY S2 553 | MgO | 3.71 | 0.30 | 0.124 |
| Ex. 3 | AGY S2 553 | ZnO | 5.61 | 0.30 | 0.082 |
| Ex. 4 | AGY S2 553 | Talc | 2.80 | 0.23 | 0.126 |
| Ex. 5 | AGY S2 553 | Talc | 2.80 | 0.45 | 0.246 |
| Ex. 6 | AGY S2 553 | $BaSO_4$ | 4.50 | 0.36 | 0.123 |
| Ex. 7 | AGY S2 553 | BN | 2.10 | 0.17 | 0.124 |
| Ex. 8 | AGY S2 553 | CaO | 3.35 | 0.28 | 0.128 |
| Ex. 9 | AGY S2 553 | $CaCO_3$ | 2.70 | 0.23 | 0.130 |
| Ex. 10 | FC295-10P | MgO | 3.71 | 0.30 | 0.124 |
| Ex. 11 | FC295-10P | CaO | 3.35 | 0.30 | 0.128 |

*30% wt loading level in all compositions

Injection Molding 0.125 in thick Type I tensile ASTM specimens and 5 in×0.5 in×0.125 in flexural specimens were injection molded using the PEEK polymer injection molding guidelines provided by the supplier. A 150 ton Toshiba injection molding press was used for this purpose.

Testing of Compositions

The mechanical properties of all specimens were tested using injection molded 0.125 inch thick ASTM test specimens which consisted of Type I tensile bars and 5 in×0.5 in×0.125 in flexural bars. The following ASTM test methods were employed in the evaluation:

D638: Tensile properties—tensile strength, tensile modulus and tensile elongation at break;
D790: Flexural properties—flexural strength, flexural modulus and flexural strain at break;
D256: Notched Izod impact resistance;
D4812: Unnotched Izod impact resistance.

Analytical Methods

1. Measurement of pH of Slurry of Glass Fibers

The glass fibers to evaluate were used as received. The deionized water used was obtained by filtration through a Millipore® filtration system to reach >18 MOhm·cm resistivity (MilliQ® water).

2.000 g of glass fibers were introduced in a 25 mL scintillation vial. 8.000 g of MilliQ® water were added to the vial and the slurry was shaken on a shaker for 30 minutes. The pH of the slurry was then measured using a pH-meter pH Accumet AP 61 from Fisher Scientific, with a combined pH/ATC electrode 13-620AP50 at room temperature. The pH of the MilliQ® water without added glass fibers was 7.5.

2. Measurement of pH of Slurry of Inorganic Additives

The inorganic additives to evaluate were used as received. The deionized water used was obtained by filtration through a Millipore® filtration system to reach >18 MOhm·cm resistivity (MilliQ® water).

1.000 g of inorganic additive was introduced in a 25 mL scintillation vial. 9.000 g of MilliQ® water were added to the vial and the slurry was shaken on a shaker for 30 minutes.

The pH of slurry was then measured using a pH-meter pH Accumet AP 61 from Fisher Scientific, with a combined pH/ATC electrode 13-620AP50 at room temperature. The pH of the MilliQ® water without added inorganic filler was 7.5.

Table 2 below reports the Δ pH values of the additive with respect to water (10% slurry) and the Δ pH values of the glass fiber with respect to water (20% slurry) in each composition.

TABLE 2

| Composition | Δ pH additive to water (10% slurry) | Δ pH glass fiber to water (20% slurry) |
|---|---|---|
| Control A | N/A | −1.6 |
| Control B | N/A | 0.3 |
| Control C | 0 | 1.3 |
| Comparative Example 1 | 3 | 1.3 |
| Ex. 1 | 3.0 | −1.6 |
| Ex. 2 | 3.0 | −1.6 |
| Ex. 3 | 1.8 | −1.6 |
| Ex. 4 | 1.1 | −1.6 |
| Ex. 5 | 1.1 | −1.6 |
| Ex. 6 | 0.6 | −1.6 |
| Ex. 7 | 0.5 | −1.6 |
| Ex. 8 | 4.3 | −1.6 |
| Ex. 9 | 2.2 | −1.6 |
| Example 10 | 3.0 | 0.3 |
| Example 11 | 3.0 | 0.3 |

Results of Mechanical Tests

The results of the mechanical tests are reported in the following Tables 3-5 below and briefly discussed in this section.

Table 3 reports the results of mechanical tests carried out on compositions containing a KetaSpire® PEEK polymer, an inorganic basic additive and an acidic glass fiber with respect to a composition (Control A) comprising only a PEEK polymer and an acidic glass fiber.

TABLE 3

| Ex. | Tensile Strength (psi) | Tensile Elongation at Break (%) | Flexural Strength (psi) | Relative Ratio Flexural Str. | Unnotched Izod Impact (ft-lb/in) | Relative Ratio Un Izod |
|---|---|---|---|---|---|---|
| Control A | 28700 | 2.7 | 41700 | 1.0 | 18.9 | 1.0 |
| Ex. 1 | 29800 | 3.0 | 46100 | 1.11 | 23.3 | 1.23 |
| Ex. 2 | 30600 | 3.2 | 46500 | 1.12 | 23.3 | 1.23 |
| Ex. 3 | 28600 | 2.8 | 42800 | 1.03 | 20.9 | 1.11 |
| Ex. 4 | 29300 | 2.8 | 43700 | 1.05 | 21.1 | 1.12 |
| Ex. 5 | 29200 | 2.8 | 44300 | 1.06 | 21.6 | 1.14 |
| Ex. 6 | 29300 | 2.8 | 42500 | 1.02 | 20.1 | 1.06 |
| Ex. 7 | 29400 | 2.8 | 42800 | 1.03 | 21.4 | 1.13 |
| Ex. 8 | 29800 | 3.1 | 45000 | 1.08 | 22.8 | 1.21 |
| Ex. 9 | 29900 | 2.9 | 43600 | 1.05 | 21.9 | 1.16 |

Figure 2:
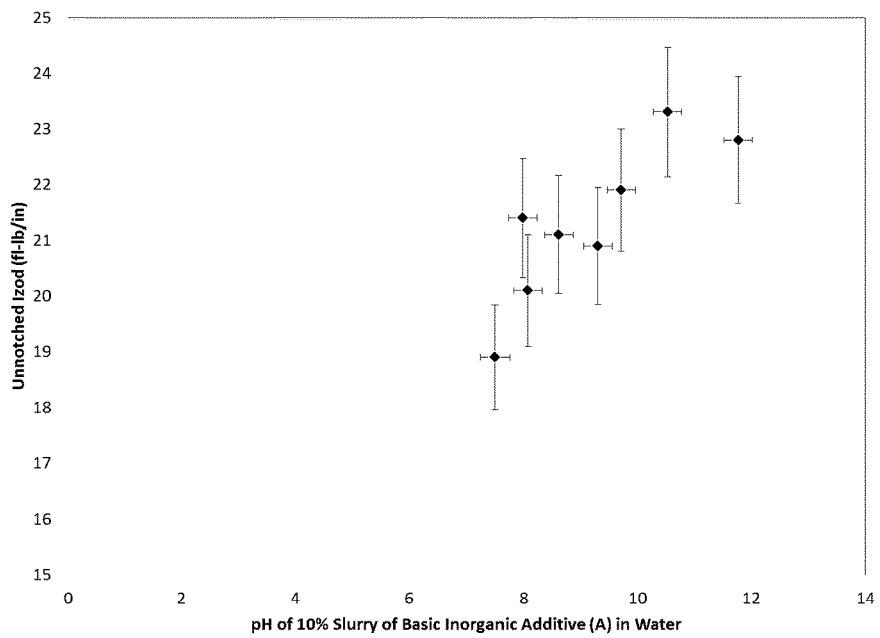
FIG. 2 reports the Unnoched Izod impact strength of a composition comprising KetaSpire® PEEK, an acidic glass fiber and a basic additive.

Flexural strengths and unnotched Izod impact values significantly above the Control composition A were unexpectedly achieved in particular with the addition of as low as 0.1 and 0.3 part per hundred by weight (phr) of magnesium oxide and also with the addition of as low as 0.28 part per hundred by weight (phr) of calcium oxide. Similar results with varying levels of effectiveness were seen for the various inorganic additives used. It can be seen from data in Table 3 and also from FIGS. 1 and 2 that the magnitude of the mechanical property enhancement in flexural strength and unnotched Izod impact correlated with the degree of basicity of the inorganic additive as measured by the pH of a 10 wt % slurry in water.

Table 4 below reports the results of mechanical tests carried out on compositions containing a KetaSpire® PEEK polymer, an inorganic basic additive (magnesium oxide and calcium oxide, which performed best when mixed with a PEEK polymer and acidic glass fiber) and a neutral glass fiber (Examples 10 and 11) with respect to a composition (Control B) comprising only a KetaSpire® PEEK polymer and a neutral glass fiber.

TABLE 4

| Ex. | Tensile Strength (psi) | Tensile Elongation at Break (%) | Flex Strength (psi) | Relative Ratio Flexural Str. | Unnotched Izod Impact (ft-lb/in) | Relative Ratio Un Izod |
|---|---|---|---|---|---|---|
| Control B | 28600 | 2.7 | 42400 | 1.0 | 19.7 | 1.0 |
| Example 10 | 29400 | 2.9 | 44000 | 1.04 | 21.5 | 1.09 |
| Example 11 | 29100 | 3.0 | 44500 | 1.05 | 21.3 | 1.08 |

The results reported in Table 4 demonstrate that there is an increase flexural strength and Unnotched Izod impact with respect to a composition that do not comprise any basic additive.

Table 5 reports the results obtained on a composition comprising a KetaSpire® PEEK polymer, an inorganic basic additive and a basic glass fiber (Comparative Example 1) with respect to a control composition (control C) which comprises a KetaSpire® PEEK polymer and a basic glass fiber only.

TABLE 5

| Example | Tensile Strength (psi) | Tensile Elongation at Break (%) | Flex Strength (psi) | Relative Ratio Flexural Str. | Unnotched Izod Impact (ft-lb/in) | Relative Ratio Un Izod |
|---|---|---|---|---|---|---|
| Control C | 23600 | 2.7 | 38000 | N/A | 17.8 | N/A |
| Comparative Ex. 1 | 23200 | 3.0 | 38200 | 1.01 | 19.1 | 1.07 |

The results reported in Table 5 show that no improvement is achieved if an inorganic basic additive is added to a KetaSpire® PEEK polymer in admixture with a basic glass fiber only.

A comparison between the results contained in tables 3 and 4 with those contained in Table 5 demonstrate that compositions comprising a polymer (PAEK), a basic inorganic additive (B), in particular magnesium oxide and calcium oxide, and an acidic glass fiber ($F_{ac}$) or a neutral glass fiber ($F_n$) are endowed with improved values of flexural strength and Unnotched Izod impact with respect to compositions comprising a polymer (PAEK), a basic inorganic additive (B) and a basic glass fiber.

Table 6 below reports the mechanical properties of Comparative Example 1, Example 2 and Example 12. Example 12 is a composition consisting of:
42% wt PEEK (KetaSpire® KT-880P)+28% wt PPSU (Radel® R-5100 NT)=70%
30% wt AGY S2 553 (acidic glass fiber) and
0.3 phr MgO.

Therefore, Example 12 is a composition of the invention corresponding to Example 2 wherein part of the polymer (PAEK) is replaced with a polymer (SP).

The results reported in the Table show that the compositions of Example 2 and 12, comprising an acidic glass fiber, are endowed with improved mechanical properties with respect to corresponding compositions comprising a basic glass fiber.

TABLE 6

| Example | Tensile Strength (psi) | Tensile Elongation at Break (%) | Flex Strength (psi) |
|---|---|---|---|
| Comparative Ex. 1 | 23200 | 3.0 | 38200 |
| Ex. 2 | 30600 | 3.2 | 46500 |
| Ex. 12 | 28600 | 3.1 | 42100 |

Table 7 below reports the mechanical properties of Example 12 in comparison with a corresponding composition wherein the acidic glass fiber was replaced with basic glass fiber OCV 910A (Comparative Example 2).

For the avoidance of doubt, Comparative Example 2 consisted of:
42% wt PEEK (KetaSpire® KT-880P)+28% wt PPSU (Radel® R-5100 NT)=70%
30% wt OCV 910A fiberglass (basic glass fiber) and
0.3 phr MgO.

The results show that compositions of the invention comprising a (PAEK) and an (SP) polymer are endowed with improved mechanical properties with respect to corresponding compositions comprising a basic glass fiber instead of an acidic glass fiber.

TABLE 7

| Example | Tensile Strength (psi) | Tensile Elongation at break (%) | Flex Strength (psi) |
|---|---|---|---|
| Example 12 | 28600 | 3.1 | 42100 |
| Comparative Example 2 | 23000 | 3.2 | 35600 |

The invention claimed is:

1. A polymer composition (C) comprising:
    (a) a poly(aryletherketone) polymer (PAEK);
    (a-1) optionally, an aromatic sulfone polymer (SP);
    (b) an acidic glass fiber ($F_{ac}$) and/or a neutral glass fiber ($F_n$); and
    (c) a basic inorganic additive (A).

2. The polymer composition of claim 1 wherein the acidic glass fiber ($F_{ac}$) is a glass fiber having a pH of at most 7.0 and the neutral glass fiber ($F_n$) is a glass fiber having a pH at least higher than 7.0 and at most 8.2.

3. The polymer composition of claim 1 comprising from 0.01% wt. to 5% wt. of the basic inorganic additive (A), with respect the total weight of the composition.

4. The polymer composition of claim 1, wherein the basic inorganic additive (A) presents a weight loss by non-isothermal thermogravimetric analysis from 50° C. to 500° C. of less than 15%.

5. The polymer composition of claim 1, wherein the basic inorganic additive (A) is selected from calcium oxide, calcium carbonate, magnesium oxide, hydrotalcite, zinc oxide, boron nitride, barium sulphate, mica, silica, talc, alumina, clay, and mixtures thereof.

6. The polymer composition of claim 1, wherein the basic inorganic additive (A) is magnesium oxide, calcium oxide, or a mixture thereof.

7. The polymer composition of claim 1, wherein the basic inorganic additive (A) is magnesium oxide.

8. The polymer composition of claim 1 having a final density equal to or higher than 1.35 g/cm$^3$.

9. The polymer composition of claim 1, wherein the poly(aryletherketone) polymer (PAEK) is a polymer comprising more than 50% moles of recurring units ($R_{PAEK}$) selected from the group consisting of formulae (J-A) to (J-O):

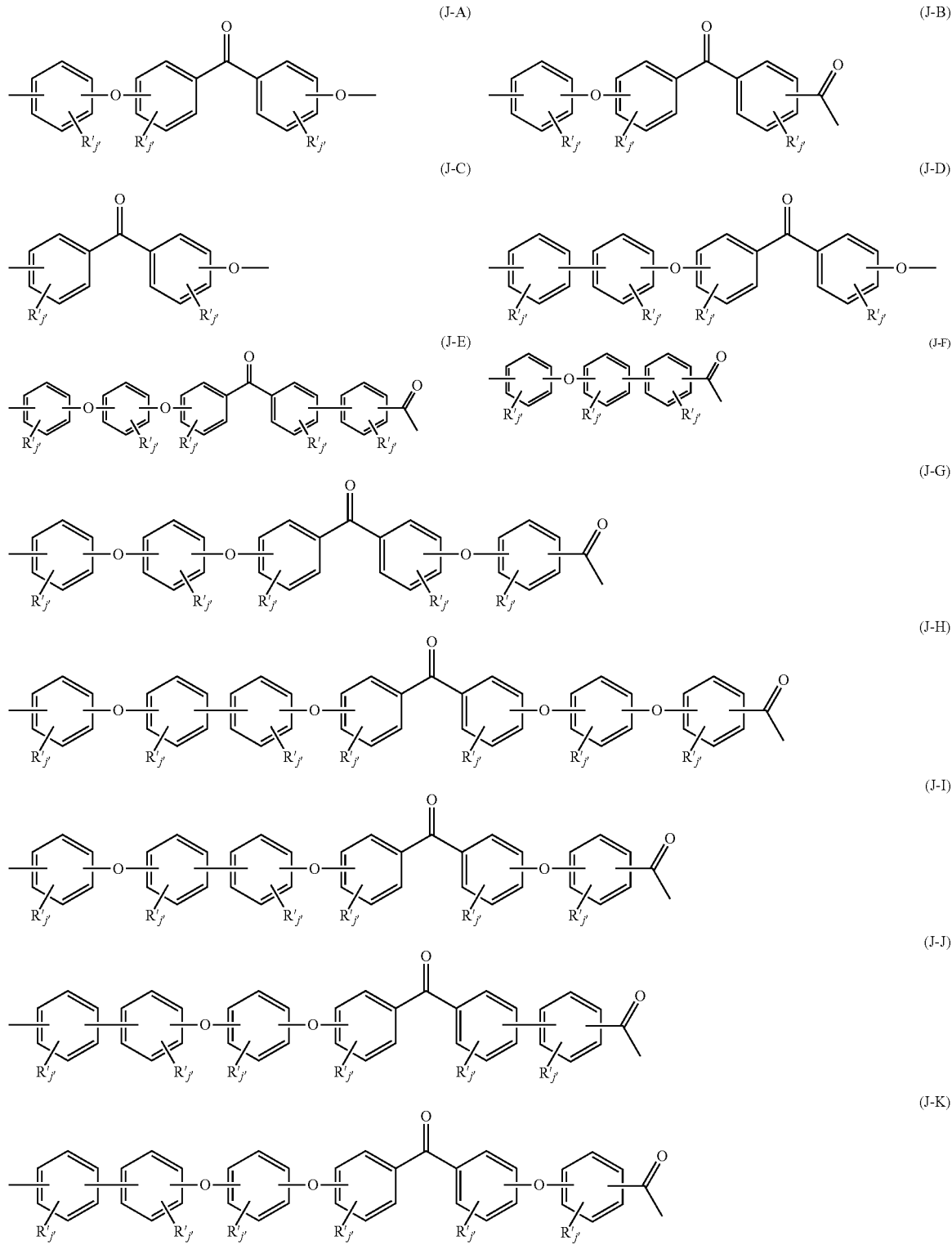

-continued

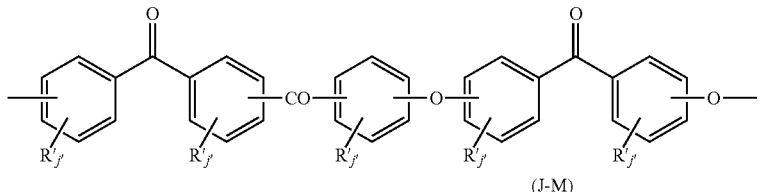
(J-L)

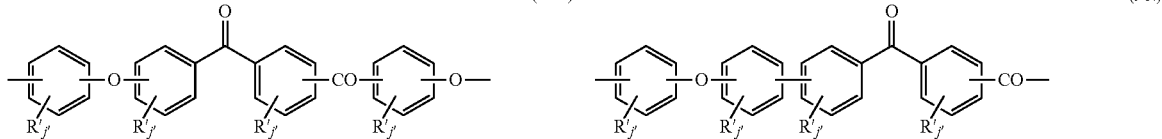
(J-M) (J-N)

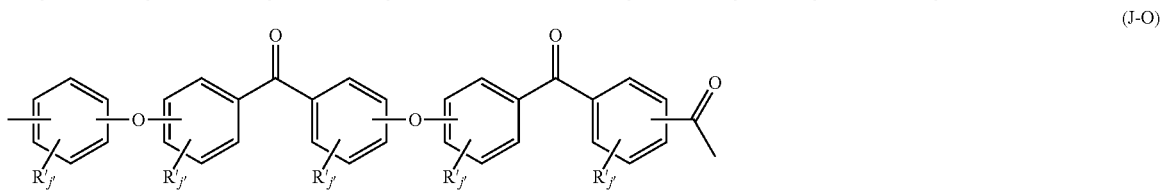
(J-O)

wherein:
  each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
  j' is zero or is an integer from 0 to 4.

10. The polymer composition of claim 1, wherein the aromatic sulfone polymer (SP) is a polymer wherein at least 50% moles of the recurring units comply with formula:

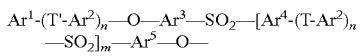

wherein:
  $Ar^1$, $Ar^2$, $Ar^3$, $Ar^4$, and $Ar^5$, equal to or different from each other and at each occurrence, are independently an aromatic mono- or polynuclear group;
  T and T', equal to or different from each other and at each occurrence, is independently a bond or a divalent group optionally comprising one or more than one heteroatom; and
  n and m, equal to or different from each other, are independently zero or an integer of 1 to 5.

11. The polymer composition of claim 10, wherein T' is selected from the group consisting of a bond, —CH$_2$—, —C(O)—, —C(CH$_3$)$_2$—, —C(CF$_3$)$_2$—, —C(=CCl$_2$)—, —SO$_2$—, —C(CH$_3$)(CH$_2$CH$_2$COOH)—, and a group of formula:

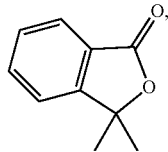

and
T is selected from the group consisting of a bond, —CH$_2$—, —C(CH$_3$)$_2$—, —C(CF$_3$)$_2$—, —C(=CCl$_2$)—, —C(CH$_3$)(CH$_2$CH$_2$COOH)—, and a group of formula:

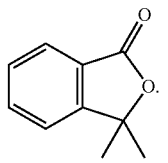

12. A finished article comprising the polymer composition of claim 1.

13. The finished article of claim 12 which is an injection moulded article, an extrusion moulded article, a shaped article, a coated article, or a casted article.

14. The finished article of claim 12 which is selected from radial and axial bearings for auto transmission, bearings used in dampers, shock absorbers, bearings for pumps, hydraulically actuated seal rings for clutch components, gears and structural parts of mobile electronic devices.

* * * * *